UNITED STATES PATENT OFFICE.

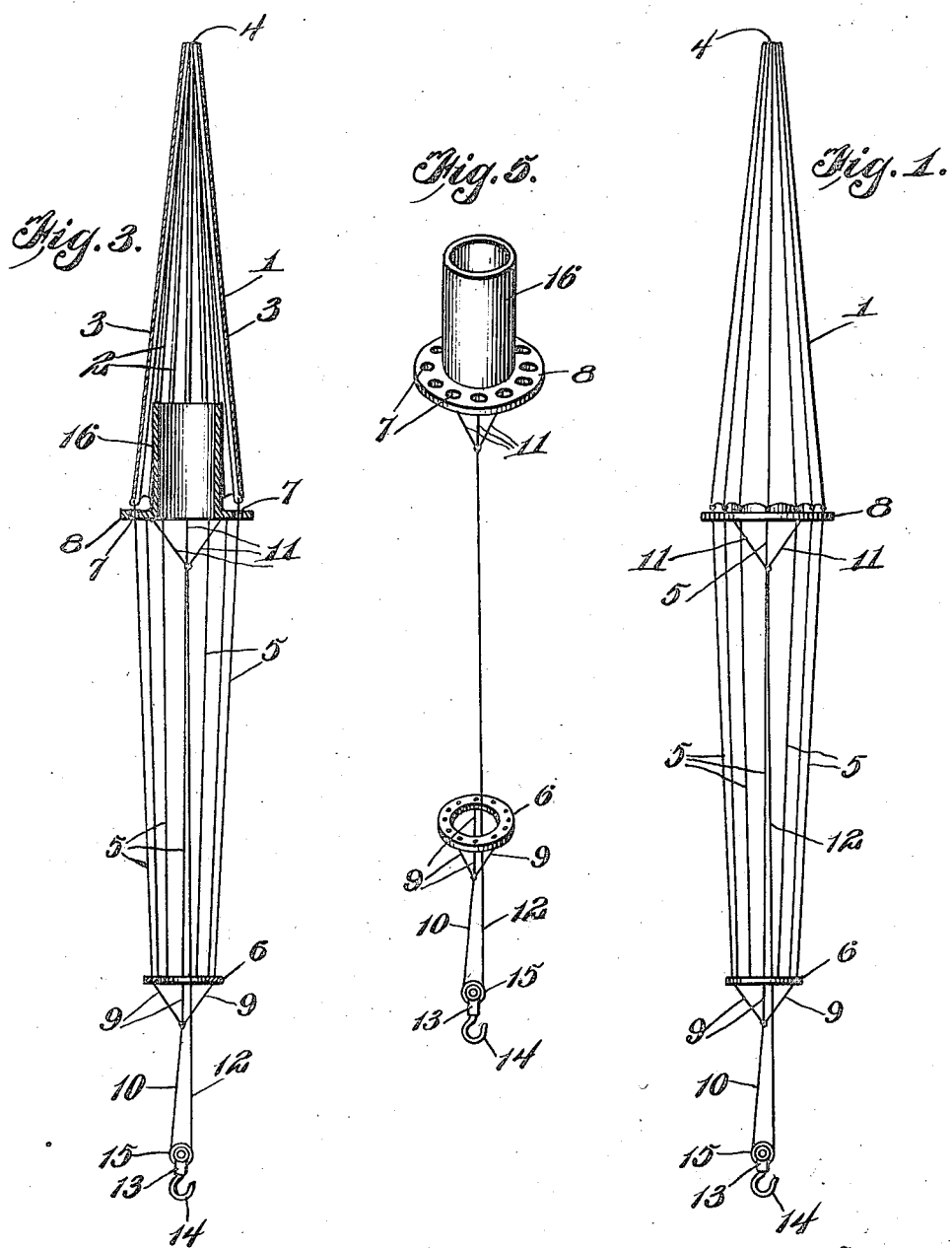

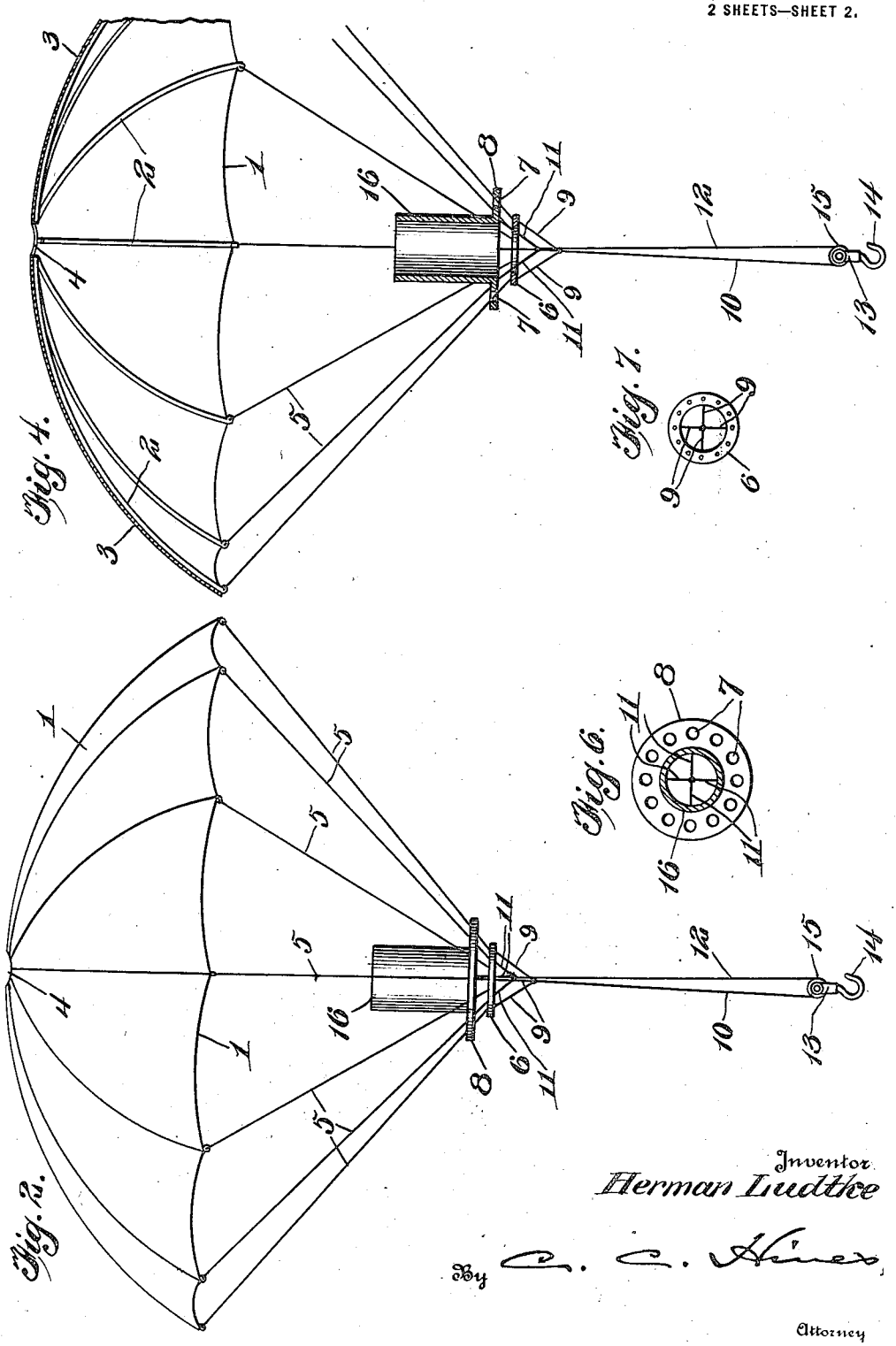

HERMAN LUDTKE, OF MORRIS, ILLINOIS.

PARACHUTE.

1,266,508.  Specification of Letters Patent.  Patented May 14, 1918.

Application filed November 24, 1917. Serial No. 203,702.

*To all whom it may concern:*

Be it known that I, HERMAN LUDTKE, a citizen of the United States, residing at Morris, in the county of Grundy and State of Illinois, have invented new and useful Improvements in Parachutes, of which the following is a specification.

This invention relates to improvements in parachutes designed particularly for use upon airplanes, aerostats and aircraft generally for the purpose of enabling the aeronaut to descend safely to the ground in the event of accident to the craft, the primary object of the invention being to provide a parachute which, while simple of construction, is adapted to positively open and fill with air as soon as launched, to insure the safe descent of the aeronaut to the ground.

A further object of the invention is to provide simple, reliable and efficient means for suspending a supporting sling or the like from the parachute body, and for insuring the instantaneous supply of air to the collapsed parachute body as soon as launched, to adapt the parachute body to quickly and positively fill and open to its fullest extent.

The invention consists of the features of construction, combination and arrangement of parts, hereinafter fully described and claimed, reference being had to the accompanying drawing, in which:—

Figure 1 is a side elevation of a safety parachute embodying my invention, showing the same in normal collapsed condition.

Fig. 2 is a similar view of the parachute as it appears when in spread condition.

Figs. 3 and 4 are vertical longitudinal sections through the parachute with the parts disposed as respectively shown in Figs. 1 and 2.

Fig. 5 is a perspective view of the sling, suspending members connecting the same with the parachute body, and the air conducting tube.

Figs. 6 and 7 are detail transverse sections on the lines 6—6 and 7—7 of Fig. 3.

In carrying my invention into practice, I provide a parachute body 1, preferably of conventional umbrella form, and comprising a frame including frame cords 2 and a suitable fabric covering 3, the said parachute body being provided with the usual air vent or opening 4.

Connected at their upper ends with the outer ends of the frame cords or members 2 are suspending cords 5, which are connected at their lower ends with a suspending ring 6, and which extend through guide openings 7 in a guide ring 8, disposed between the parachute body and the said suspending ring 6.

Connected at its upper end by suitable branches 9 to the suspending ring 6 is a sling suspending rope or cord 10, which has its opposite end connected by branches 11 with the guide ring 8, the intermediate portion of said rope being arranged to form a bight or loop 12. Suspended from this bight or loop is a hanger 13, preferably composed of an ordinary pulley block carrying a suspending hook or the like 14. About the pulley 15 carried by said block extends the looped portion of the rope, which is arranged to travel upon the pulley in the opening and closing movements of the parachute.

The guide ring 8 forms a perforate support for an air inlet tube 16 projecting upwardly therefrom, which tube normally extends into the base of the parachute body 1, when said parachute body is collapsed, so that when the parachute is launched air will be instantaneously supplied through the ring 8 and tube 16 to the interior of the parachute. Provision is thus made for the immediate supply of air to the parachute as soon as launched or dropped, insuring its positive and instantaneous opening under air pressure, and avoiding all liability of the parts of the parachute body clinging together or becoming entangled and failing to open when launched from the aircraft.

In practice, the sling or other harness fastened to the aviator's body is connected with the hook or suspending member 14, whereby the aviator will be supported from the parachute when said parachute is launched from the aircraft Upon the launching of the parachute the pressure of the air at once admitted to the parachute body will begin to spread the same, and simultaneously the weight of the body of the aviator falling on the suspending device 13 will draw down upon the end of the rope 12 connected with the guide ring 8 and tube 16, thus withdrawing the tube from the parachute and allowing the latter to fill and spread instantaneously. In the opening movement of the parachute the cords 5 will move outwardly through the guide opening 7 in the ring 8 and draw the ring 6 upwardly as the ring 8 descends, until the parts reach the fully operative or spread condition shown in Fig. 2, whereby the tube 16 will be moved to a non-interfering position and guided in its downward movement by the travel of the ring 8 on the cords 5, said ring 8 keeping the cord spread and preventing the same from becoming entangled, as will be readily understood. Hence it will be seen that provision is made admitting air immediately to the parachute at the moment of release through a filling tube, which is then withdrawn to allow the parachute to open when under a full volume of air as it falls, the tube and the guide ring by which it is supported holding the suspending cords spaced and separated to prevent any interference with the full and free movement of the parachute to open position. Hence it will be apparent that a positive opening of the parachute will occur, and all liability of any interference under all normal conditions with the free and full opening of the parachute prevented, thus insuring the safe opening of the parachute and safe descent of the aviator to the ground.

Having thus fully described my invention, I claim:

1. A parachute comprising a parachute body, a suspension member, suspension cords connecting the frame elements of the parachute body with said suspension member, a filling tube movably mounted on said suspending cords and normally projecting into the collapsed parachute body, a looped suspending rope connected with the suspending member and filling tube, and a sling supporting device hung in the bight of said rope.

2. A parachute comprising a parachute body, a suspending member, suspension cords connected with the frame elements of the parachute body and with said suspending member, a guide ring having openings for the passage of the suspending cords, whereby said ring is slidably mounted on said cords, a filling tube carried by said ring and normally projecting into the collapsed parachute body, a suspending rope terminally connected with the suspending member and guide ring and arranged to form a bight or loop, and a sling suspending member including a pulley block hung in the bight of said rope.

In testimony whereof I affix my signature.

HERMAN LUDTKE.